United States Patent
Kukanur et al.

(10) Patent No.: US 8,755,315 B1
(45) Date of Patent: Jun. 17, 2014

(54) PACKET CLASSIFICATION BASED POWER SAVING RECEIVER

(75) Inventors: Shivappa Kukanur, Sunnyvale, CA (US); Cesar A. Johnston, Sunnyvale, CA (US)

(73) Assignee: Marvell International Ltd (BM)

( * ) Notice: Subject to any disclaimer, the term of this patent is extended or adjusted under 35 U.S.C. 154(b) by 624 days.

(21) Appl. No.: 12/951,518

(22) Filed: Nov. 22, 2010

Related U.S. Application Data

(60) Provisional application No. 61/292,419, filed on Jan. 5, 2010.

(51) Int. Cl.
*G08C 17/00* (2006.01)
*H04Q 7/00* (2006.01)

(52) U.S. Cl.
USPC ........... 370/311; 370/328; 370/252; 370/318; 370/329; 455/574; 455/343.1; 455/343.2

(58) Field of Classification Search
USPC ................. 370/311, 328, 252, 318, 329, 338; 455/574, 343.1, 343.2, 343.3; 714/746, 714/748; 709/225
See application file for complete search history.

(56) References Cited

U.S. PATENT DOCUMENTS

| | | | |
|---|---|---|---|
| 8,116,245 B2 * | 2/2012 | Kwon et al. | 370/311 |
| 2003/0012163 A1 * | 1/2003 | Cafarelli et al. | 370/338 |
| 2006/0062181 A1 * | 3/2006 | Chou | 370/329 |
| 2008/0117848 A1 * | 5/2008 | Yang et al. | 370/311 |
| 2008/0254841 A1 * | 10/2008 | Miyata | 455/574 |
| 2011/0090844 A1 * | 4/2011 | Gong et al. | 370/328 |

OTHER PUBLICATIONS

Lin, Yuxia, et al. "Frame Aggregation and Optimal Frame Size Adaptation for IEEE 802.11n WLANs", Department of Electrical and Computer Engineering, The University of British Columbia, Vancouver, BC, Canada V6T 1Z4 (6 pgs).

August, Nathaniel J., et al. "An Efficient UWB Radio Architecture for Busy Signal MAC Protocols", Virginia Tech VLSI for Telecommunications (VTVT) Lab, Bradley Department of Electrical and Computer Engineering, Virginia Tech, Blacksburg, VA presented at IEEE Conference on Sensor Ad Hoc Communications and Networks, Oct. 2004, Santa Clara, USA (10 pgs).

* cited by examiner

*Primary Examiner* — Charles C Jiang
*Assistant Examiner* — Jamal Javaid

(57) ABSTRACT

Receivers, apparatuses, and methods associated with packet classification based power saving receiver are described. In one embodiment, an 802.11 receiver includes receive and control units. The receive unit has a higher power receive frame state and a lower power ignore frame state. The receive unit, when in the receive frame state, receives radio frequency (RF) signals associated with an incoming frame and provides decoded information concerning the incoming frame. The receive unit, when in the ignore frame state, does not receive RF signals associated with the incoming frame and/or does not decode RF signals associated with the incoming frame. The control unit controls the receive unit to enter the ignore frame state upon determining that the incoming frame is to be filtered and to return to the receive frame state in time to receive a subsequent incoming frame and perform end of frame processing consistent with the CSMA/CA protocol.

18 Claims, 5 Drawing Sheets

PACKET CLASSIFICATION BASED POWER SAVING RECEIVER

CROSS REFERENCE TO RELATED APPLICATIONS

This application claims the benefit of U.S. provisional application Ser. No. 61/292,419 filed on Jan. 5, 2010, which is hereby wholly incorporated by reference.

BACKGROUND

Conventional 802.11 wireless receivers typically include, among other units, a radio frequency unit (RFU), an analog baseband processing (ABB) unit, a digital baseband processing (DBB) unit, and a media access control (MAC) unit. Such conventional 802.11 wireless receivers typically receive and decode all frames detected by the wireless receivers. For example, after being decoded, frames intended for a host are provided to the host, while frames not intended for the host are discarded or ignored. Unfortunately, receiving and decoding frames that are not intended for a host wastes power.

A classification/filtering scheme is generally used to determine whether or not frames are intended for a host. Classification is a process of extracting information from the MAC Header and signal field of an incoming frame—e.g., a MAC address of the receiver (target address), a MAC address of the sender, a frame type, a subtype, and QOS—and assessing the information with a set of policies as defined by a host, which results in classification of the frame as being intended or not intended (filtered) for the host.

Information required for classification of a frame is typically available in a relatively small portion at the beginning of the frame, thus providing ample opportunity to save power by switching the receiver subsystems to low power states for the remaining duration of a frame determined to be filtered out.

Conventionally, if a filtered frame is received correctly (e.g., frame check sequence (FCS) pass, cyclic redundancy check (CRC) pass), then the duration-id field in the incoming frame is used as a virtual carrier sense, and network allocation vector (NAV) processing is triggered for the end of frame processing associated with a carrier sense multiple access with collision avoidance (CSMA/CA) protocol. Additionally, if a filtered frame is received incorrectly (e.g., FCS fail, CRC fail), then extended inter-frame spacing (EIFS) is triggered for the end of frame processing for the CSMA/CA protocol.

SUMMARY

In one embodiment an apparatus includes a receive unit and a control unit. The receive unit and the control unit are configured to receive wireless 802.11 messages according to a wireless carrier sense multiple access collision avoid (CSMA/CA) protocol. The receive unit is configured with a receive frame state and an ignore frame state. The receive frame state is a higher power state than the ignore frame state. The receive unit is configured, when in the receive frame state, to receive radio frequency (RF) signals associated with an incoming frame and to provide decoded information concerning the incoming frame. The receive unit is configured, when in the ignore frame state, to perform one or more of, (i) not receiving RF signals associated with the incoming frame, and (ii) not decoding RF signals associated with the incoming frame. The control unit is configured to selectively control whether the receive unit is in the receive frame state or the ignore frame state. The control unit is configured to selectively control the receive unit to enter the ignore frame state upon determining that the incoming frame is to be filtered and to return to the receive frame state in time to receive a subsequent incoming frame and in time to perform end of frame processing consistent with the CSMA/CA protocol.

In another embodiment, a method for controlling power modes for one or more sub-systems in an 802.11 receiver is provided. The method includes detecting an incoming frame being received at the receiver via a wireless signal, controlling the receiver to receive and decode the incoming frame until frame information comprising an intended target for the incoming frame and a frame duration for the incoming frame have been acquired, selectively controlling one or more sub-systems in the receiver to change state from a higher power receive mode to a lower power save mode as a function of the frame information and an expected power savings, where the expected power savings is computed as a function of the frame duration and switching times for the one or more sub-systems, and selectively controlling one or more sub-systems in the receiver to change state from the lower power save mode to the higher power receive mode in time to maintain end of frame processing associated with a carrier sense multiple access collision avoidance (CSMA/CA) protocol with which the 802.11 receiver is complying and in time to detect the next incoming frame.

In another embodiment, an 802.11 transceiver device is provided. The transceiver includes a receiver configured to selectively change from a higher power receive state to a lower power state where the remainder of incoming RF signals associated with an incoming frame are not received or decoded upon deciding to ignore the incoming frame. Deciding to ignore the incoming frame is a function of analyzing information gathered by partially receiving and partially decoding the incoming frame, the information comprising an intended target for the incoming frame and an expected amount of time required to receive the incoming frame.

BRIEF DESCRIPTION OF THE DRAWINGS

The accompanying drawings, which are incorporated in and constitute a part of the specification, illustrate various receivers, apparatuses, methods, and other embodiments. It will be appreciated that the illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example receivers can save power when compared to conventional receivers by selectively reducing power in one or more receiver subsystems upon determining that an incoming frame is to be ignored. The determination to ignore a frame may be based on information contained in header fields (e.g., MAC HEADER fields) appearing in an incoming frame. The information may reveal, for example, that the incoming frame is not intended for a host associated with the receiver's MAC unit. The determination may also be based on the strength of the signal associated with the incoming frame and/or a signal-to-noise ratio (SNR) associated with the signal. The header fields may identify the frame intended target. The header fields may also provide information from which the remaining time required to receive the remaining portion of the incoming frame can be determined. The information may be located, for example, in a signal field. A receiver subsystem may be switched to a lower power state and then switched back to a power state suitable for receiving the next incoming frame if the switching can be achieved in an appropriate amount of time given the time it will take to receive the remaining portion of the incoming frame. If there is insufficient time to switch from a current power state to a lower power state and then back to a receiving power state, then the incoming frame may be treated conventionally.

If a receiver subsystem is switched to a lower power state, then the receiver may perform protocol preserving actions involving the clear channel assessment (CCA) line and end of frame processing (e.g., NAV update, EIFS processing). Since example receivers are selectively powered down, they do not continuously sense and decode. Therefore, an example MAC drives an appropriate state (BUSY) onto the CCA line for the estimated remaining duration of an aborted frame, or until the regular CCA line drive is powered back up. Additionally, an example MAC provides different ways to control either NAV update or EIFS processing at the estimated end of the aborted frame. In one example, the MAC will cause all aborted frames to be treated as FCS fail frames and trigger EIFS. In another example, the MAC will cause all aborted frames to be treated as FCS pass frames and trigger NAV update. In another example, the MAC will treat aborted frames that are longer than a threshold length as FCS fail frames and trigger EIFS while treating aborted frames that are shorter than the threshold length as FCS pass frames and trigger NAV update. The NAV/EIFS decision may be based on other or additional criteria.

Figure 1:
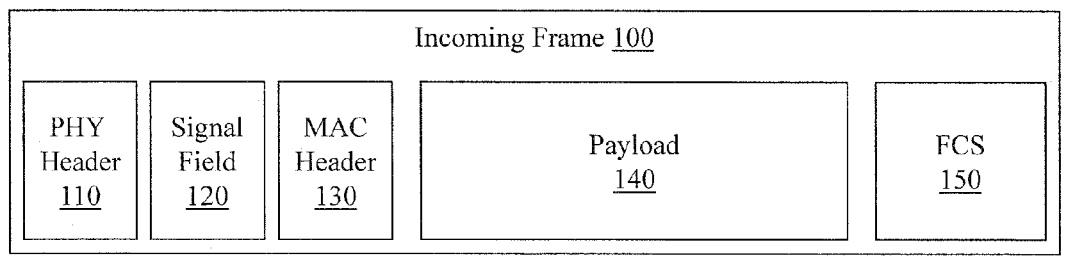
FIG. 1 illustrates one embodiment of a packet that can be input to a packet classification based power saving receiver.

FIG. 1 illustrates one embodiment of an incoming frame (e.g., packet 100) that can be input to a packet classification based power saving receiver. Packet 100 includes a PHY header 110, a signal field 120, a MAC header 130, a payload 140, and a frame check sequence (FCS) 150. The PHY header 110, the signal field 120, and the MAC header 130 may occupy a relative small number of bytes (e.g., 50 bytes) as compared to the payload 140 which may occupy a relative larger number of bytes (e.g., up to 64 KB). A conventional receiver will still receive and decode the entire payload 140 even if the conventional receiver knows that the payload 140 is going to be discarded. An example receiver can make an informed decision about not receiving the payload 140 based on information in the PHY header 110, the signal field 120, and the MAC header 130.

In one example, the signal field 120 may include information about the remainder of the packet 100 starting from the end of the signal field 120 to the end of the FCS 150. In another example, the signal field 120 may include information about the packet 100 as a whole. Given the information in the signal field 120 and knowledge about the receiver properties of a receiver that is receiving packet 100, an estimate can be made concerning how long it will take to receive the remainder of packet 100. Thus, if switching times allow, packet 100 may be ignored by switching one or more elements in the receiver to a lower power mode. Being able to selectively power down an element(s) in a receiver facilitates producing a packet classification based power saving receiver that will consume less power than a conventional receiver.

Figure 2:
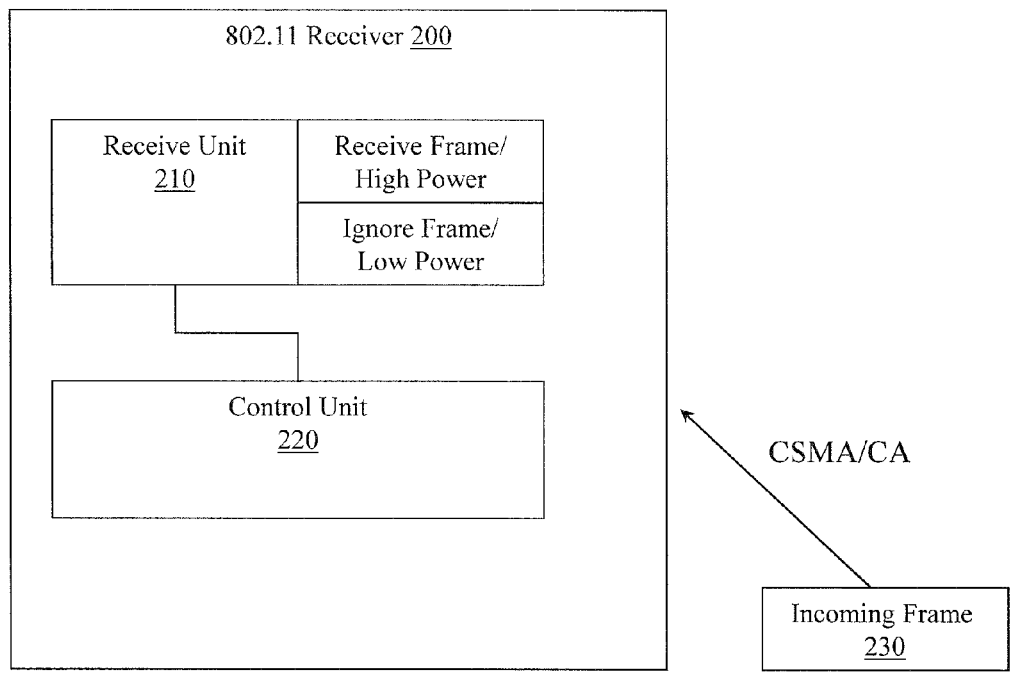
FIG. 2 illustrates one embodiment of a packet classification based power saving receiver.

FIG. 2 illustrates one embodiment of an 802.11 receiver apparatus 200. The apparatus 200 includes a receive unit 210 and a control unit 220. The receive unit 210 and the control unit 220 are configured to receive an incoming frame 230 using a wireless carrier sense multiple access collision avoid (CSMA/CA) protocol. In one example, the incoming frame 230 may include a physical layer (PHY) header, a signal field, a media access control (MAC) header, a payload, and a frame check sequence (FCS). The signal field includes information from which the amount of time expected to be required to receive the remainder of the incoming frame 230 can be computed.

The receive unit 210 can be configured to be in either a receive frame state or an ignore frame state. The receive frame state is a higher power state than the ignore frame state. The receive unit 210 is configured to operate differently when it is in the receive frame state than when it is in the ignore frame state. When the receive unit 210 is in the receive frame state, the receive unit 210 controls the receiver 200 to receive radio frequency (RF) signals associated with the incoming frame 230. When the receive unit 210 is in the receive frame state, the receive unit 210 also controls the receiver 200 to provide decoded information concerning the incoming frame 230. The decoded information may be provided, for example, to a host that is using the receiver 200 to communicate wirelessly.

When in the ignore frame state, the receive unit 210 is configured to control the receiver 200 to either not receive RF signals associated with the incoming frame 230 or to not decode RF signals associated with the incoming frame 230. Not receiving RF signals can be accomplished by powering down units in the receiver 200 like antennas and RF receive elements. Not decoding a received RF signal can also be accomplished by powering down units like baseband decoders in the receiver 200.

The control unit 220 is configured to selectively control whether the receive unit 210 is in the receive frame state or the ignore frame state. The control unit 220 can make the decision concerning the receive unit 210 power state based on different inputs. In one example, the control unit 220 is configured to selectively control the receive unit 210 to enter the ignore frame state upon determining that the incoming frame 230 is to be filtered. "Filtering" the incoming frame 230 can refer, for example, to ignoring, partially ignoring, discarding, and/or partially discarding the frame. If the control unit 220 causes the receive unit 210 to enter the lower power state where RF signals are not received and/or not decoded, then control unit 220 is also responsible for causing the receive unit 210 to return to the receive frame state in time to receive a subsequent incoming frame and in time to perform end of frame processing consistent with the CSMA/CA protocol. Otherwise the receiver 200 could be a very obtrusive and annoying member of a wireless network with which it is interacting.

The inputs to the control unit 220 can include information decoded from the incoming frame 230. In one example, the information may be located near the beginning of the frame to facilitate ignoring a useful amount of following information in the frame 230. The decoded information can include, for example, an identifier of an intended target for the incoming frame 230 and an expected duration of the incoming frame 230. In one example, the control unit 220 can determine that the incoming frame 230 is to be filtered (e.g., ignored) based on the intended target for the incoming frame 230. If the incoming frame 230 is not intended for a host connected to receiver 200, then the incoming frame 230 may be a candidate for filtering. However, just knowing the intended target may not provide enough information to make a decision to power down an element(s) in the receiver 200. For example, it may not make sense to base power down decisions on information received over very weak channels. Therefore, in one example, the control unit 220 is configured to determine that the incoming frame 230 is to be filtered based on additional criteria including, but not limited to, a signal strength associated with the RF signals associated with the incoming frame 230, and a signal to noise ratio (SNR) associated with the RF signals associated with the incoming frame 230. In this way, the receiver 200 will not be powered down due to information carried on a weak channel and thus the receiver 200 will still be able to hear information carried on stronger channels that may supersede the weak signal.

In one example, the control unit 220 is configured to control the receive unit 210 to enter the ignore frame state upon determining that the incoming frame 230 is to be filtered and upon determining that a desired ratio between switching time and the amount of time expected to be required to receive the remainder of the incoming frame 230 exceeds a threshold. The switching time comprises the time it takes to switch the receive unit 210 to the ignore frame state from the receive frame state and the time it takes to switch the receive unit 210 back to the receive frame state from the ignore frame state. This additional criteria is evaluated to make sure that it makes sense to power down an element in the receiver 200 and then to power it back up. Powering down a physical device and then powering up a physical device may not be an instantaneous operation. For example, it may take time for a capacitor to discharge or for a capacitor to be charged. Additionally, it may take time for a circuit like a phase-locked loop to stabilize. Therefore, it may only make sense to power down and power up if the switching times are less than the duration of the remainder of the incoming frame 230. If the switching times exceed the duration of the remainder of the incoming frame 230, then the receiver 200 may not be ready to perform appropriate end of frame processing and may not be ready to hear the next incoming frame.

The receiver 200 may not be operating alone. Indeed, the receiver 200 may be operating as part of a wireless network. To be a good citizen on the network, and to adhere to a protocol (e.g., CSMA/CA), certain actions may need to be taken when the end of a frame is detected. The actions may include, for example, signaling whether the frame was received correctly, establishing times for media contention, and so on. Thus, in one example, the control unit 220 controls the receive unit 210 to perform end of frame processing consistent with the CSMA/CA protocol. This end of frame processing can include, for example, triggering a network allocation vector (NAV) update, and/or triggering extended inter-frame spacing (EIFS) processing. Since the receiver 200 may not have received the entire payload of a message that is aborted to save power, it may be impossible for the receiver 200 to know whether the message was received correctly. Therefore, in different examples, the receive unit 210 can be configured to perform different end of frame processing consistent with the CSMA/CA protocol. The different treatments include, but are not limited to, treating a filtered incoming frame as a frame that has passed a frame check sequence (FCS) test and therefore triggering NAV update processing for the filtered incoming frame, treating a filtered incoming frame as a frame that has failed an FCS test and therefore triggering EIFS processing for the filtered incoming frame, and selectively triggering NAV update processing when a filtered incoming frame is less than a threshold duration and selectively triggering EIFS processing for a filtered incoming frame when a filtered incoming frame is longer than the threshold duration. While frame length is described as one criteria for selecting between NAV/EIFS processing, other criteria may also be consulted including but not limited to channel quality and/or bit error rates.

In one example, the receiver 200 may be part of an 802.11 transceiver device. The transceiver may include the receiver 200 and a transmitter. The receiver 200 is configured to selectively enter a low power state where the remainder of incoming RF signals associated with an incoming frame 230 are not received or decoded upon deciding to ignore the incoming frame 230. The decision to ignore the incoming frame 230 can be made by the receiver 200 as a function of analyzing information gathered by partially receiving and partially decoding the incoming frame 230. The information decoded from the incoming frame can include an intended target for the incoming frame 230 and an expected amount of time required to receive the incoming frame 230.

Figure 3:
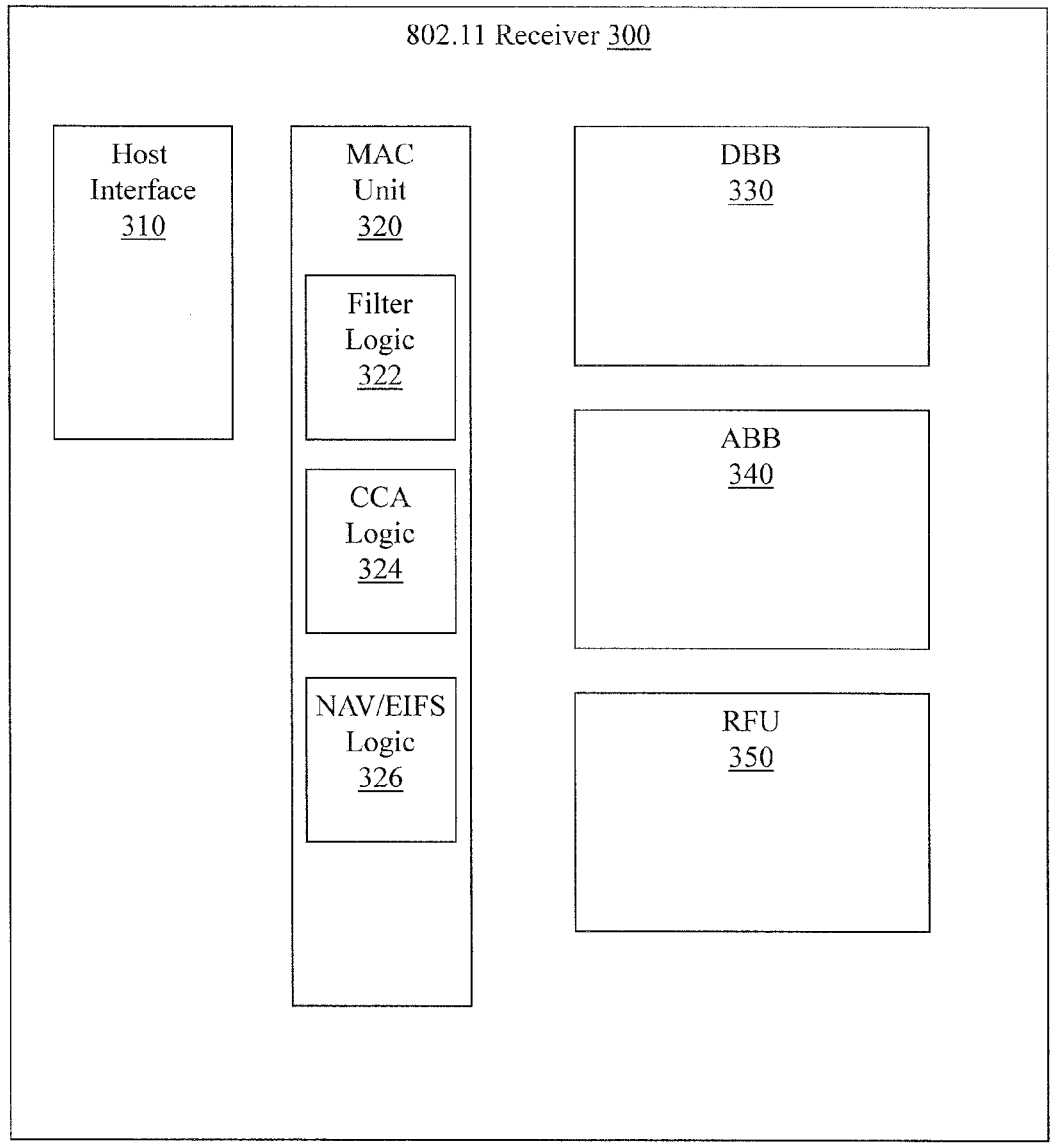
FIG. 3 illustrates another embodiment of a packet classification based power saving receiver.

FIG. 3 illustrates another embodiment of a packet classification based power saving receiver 300. This embodiment of receiver 300 includes a host interface 310, a MAC unit 320, a digital baseband processing unit (DBB) 330, an analog baseband processing unit (ABB) 340, and a radio frequency unit (RFU) 350. The MAC unit 320 may include filter logic 322, clear channel assessment logic 324, and NAV/EIFS logic 326. In one embodiment, the MAC unit 320 may implement the control unit 220 (FIG. 2) while the RFU 350, ABB 340, and DBB 330 may implement the receive unit 210 (FIG. 2). The MAC unit 320 can control the overall state of the receive components by controlling the state of one or more of, the RFU 350, the ABB 340, and the DBB 330.

In one example, the RFU 350 is configured to receive the RF signals associated with the incoming frame and has two or more power states. The ABB 340 is configured to convert analog baseband signals associated with the incoming frame into digital baseband signals associated with the incoming frame. The ABB 340 also has two or more power states. The DBB 330 is configured to decode the digital baseband signals and to provide the decoded information to, for example, the MAC unit 320. The DBB 330 also has two or more power states.

In one example, the two or more power states for the RFU 350 include a power down state where the RFU 350 consumes $I_{rf\_pd}$ mA of power, a sleep state where the RFU 350 consumes less than $I_{rf\_slp}$ mA of power, a standby state where the RFU 350 consumes less than $I_{rf\_sb}$ mA of power, and a receive state where the RFU 350 consumes more than $I_{rf\_rx}$ mA of power; where $I_{rf\_rx} > I_{rf\_sb} > I_{rf\_slp} > I_{rf\_pd}$. A different number of states may be employed. Similarly, different power consumption levels may be associated with different states. In one example, the MAC unit 320 may control the RFU 350 power states independently of the power states of either the ABB 340 or the DBB 330.

In another example, the two or more power states for ABB 340 include a sleep state where the ABB 340 consumes less than $I_{ab\_slp}$ mA of power, a standby state where the ABB 340 consumes less than $I_{ab\_sb}$ mA of power, and a receive state where the ABB 340 consumes more than $I_{ab\_rx}$ mA of power; where $I_{ab\_rx} > I_{ab\_sb} > I_{ab\_slp}$. A different number of states may be employed. Similarly, different power consumption levels may be associated with different states. In one example, the MAC unit 320 may control the ABB 340 power states independently of the power states of either the RFU 350 or the DBB 330.

In another example, the two or more power states for the DBB 330 include a sleep state where the DBB 330 consumes $I_{db\_slp}$ mA of power, a standby state where the DBB 330 consumes less than $I_{db\_sb}$ mA of power, an idle receive state where the DBB 330 consumes less than $I_{db\_idle}$ mA of power, and an active receive state where the DBB 330 consumes more than $I_{db\_act}$ mA of power; where $I_{db\_act} > I_{db\_idle} > I_{db\_sb} > I_{db\_slp}$. A different number of states may be employed. Similarly, different power consumption levels may be associated with different states. In one example, the MAC unit 320 can control the DBB 330 power states independently from the power states of the ABB 340 or the RFU 350.

The MAC unit 320 may be configured to decode frame information from the decoded information provided by the DBB 330. Recall that an incoming frame may include a physical layer (PHY) header, a signal field, a MAC header, a payload, and a frame check sequence (FCS). Recall also that the signal field may include information from which the amount of time expected to be required to receive the remainder of the incoming frame is computed.

The MAC unit 320 may include filter logic 322 for determining whether to filter a frame. The filter decision may be made on criteria including intended target, sender identity, frame type/subtype, switching time versus remaining duration time, signal strength, and so on. The MAC unit 320 may also include CCA logic 324 for driving a pre-determined signal onto a clear channel assessment (CCA) line controlled by the receiver apparatus while the receive components are in an ignore frame state. The pre-determined signal may be, for example, a BUSY signal specified by the 802.11 standard. The MAC unit 320 may also include NAV/EIFS logic 326 for selecting and performing either NAV or EIFS processing at the estimated end of the aborted frame. Different NAV/EIFS decisions may be made based, for example, on packet length or on other criteria.

Figure 4:
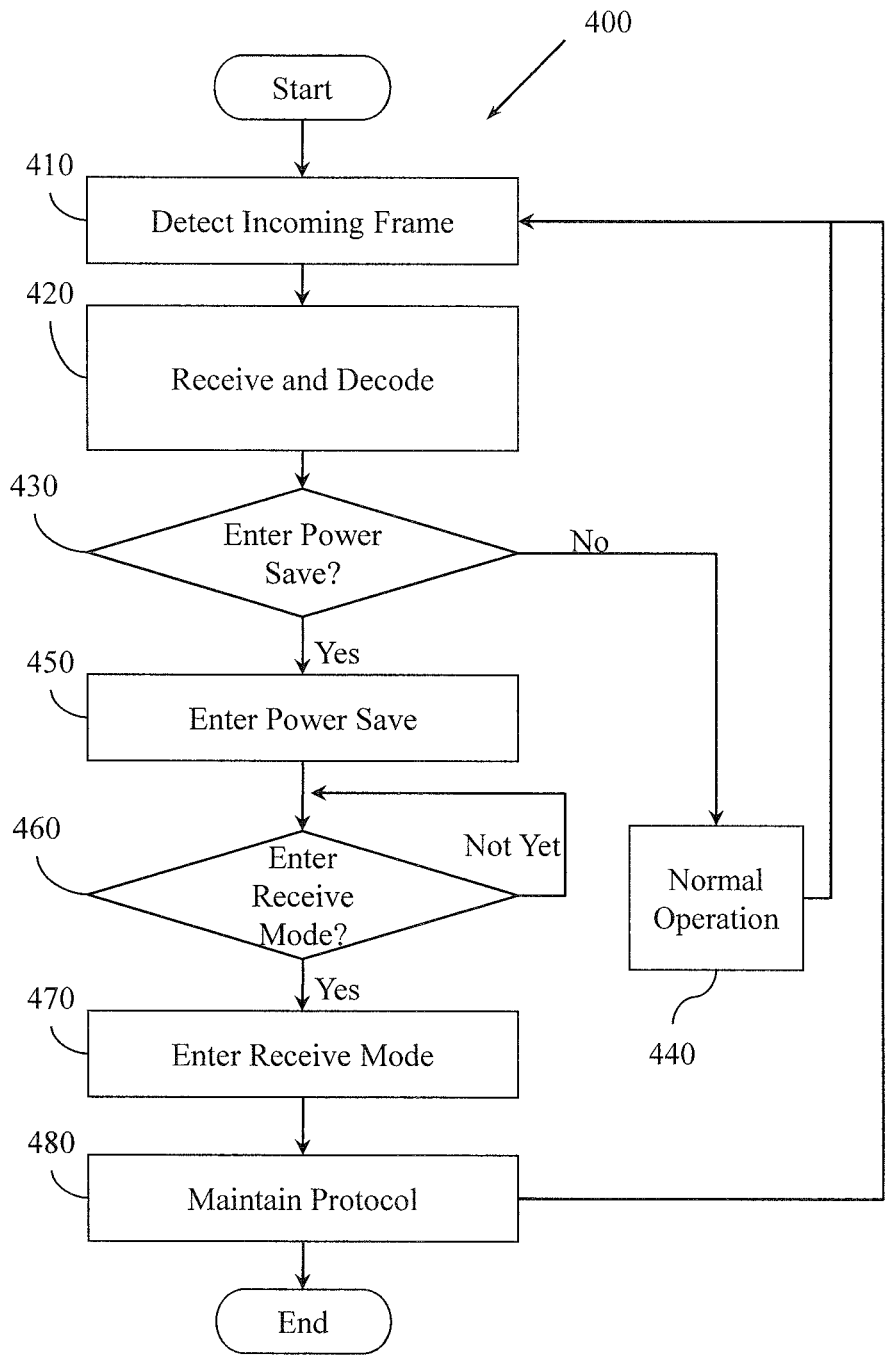
FIG. 4 illustrates one embodiment of a method associated with a packet classification based power saving receiver.

FIG. 4 illustrates one embodiment of a method 400 associated with a packet classification based power saving receiver. Method 400 facilitates controlling power modes in an 802.11 receiver. At 410, method 400 includes detecting an incoming frame being received at the receiver via a wireless signal. The detecting may be performed by, for example, an RFU, or a baseband processing unit.

At 420, method 400 includes controlling the receiver to receive and decode the incoming frame. The receiving and decoding at 420 continues until frame information comprising an intended target for the incoming frame and a frame duration for the incoming frame have been acquired. The intended target may be located, for example, in a MAC header. The duration may be located, for example, in a signal field. The intended target and duration may provide enough information for making a receive/ignore decision. Since the information may be acquired in a relatively small number of bytes (e.g., 50 bytes) as compared to an overall frame size (e.g., 64 KB), significant power savings may be achieved if the receiver can be powered down for the remainder of the (64 KB −50) bytes.

At 430, method 400 includes making a determination concerning entering the power save mode. If the decision at 430 is no, then a frame may be processed using normal operation at 440. If the decision at 430 is yes, then at 450, method 400 may control a receiver to enter power save mode. Entering power save mode at 450 may include controlling a sub-system(s) (e.g., RFU, ABB, DBB) in the receiver to change state from a higher power receive mode to a lower power save mode. One or more of the RFU, ABB, and DBB may be controlled. The determination at 430 may be made as a function of the frame information and an expected power savings.

The expected power savings may be computed, for example, as a function of the remaining frame duration and switching times for the sub-system(s) to be powered down and powered up back. For example, if the time to switch a sub-system(s) into power save mode and then back to receive mode is less than the remaining duration of the frame, then the switching may occur and the receiver may enter the power save mode. But if the time to switch a sub-system(s) into power save mode and then back to receive mode exceeds the remaining duration of the frame, then switching may not occur. The decision to enter the power saving mode may also consider signal strength information associated with the wireless signal transmitting the incoming frame. Different messages may be received on channels having different signal strengths of different SNRs. It may not be wise to base a power down decision on a message received on a channel whose signal is below a desired threshold because a more reliable or more readable superseding message may be received on a stronger channel during the time during which the receiver was in a power save mode in response to a message that was likely going to be superseded.

When the receiver is switched into power save mode, method 400 will subsequently selectively control a sub-system(s) in the receiver to change state from the lower power save mode to the higher power receive mode in time (at the estimated end of the remaining frame duration) to maintain end of frame processing associated with a carrier sense multiple access collision avoidance (CSMA/CA) protocol with which the 802.11 receiver is complying. The sub-system(s) in the receiver also needs to be switched back to receive mode in time to detect the next incoming frame.

Thus, at 460, method 400 makes a decision concerning whether it is time to put the receiver back in receive mode. If the determination at 460 is no, then the receiver remains in the power saving mode and determinations at 460 continue. The determinations at 460 may be based, for example, on a down-counter in a receive unit (e.g., MAC unit) that maintains the remaining time of the frame. If the determination at 460 is yes, then at 470, the receiver is put back in receive mode. Placing the receiver back in receive mode at 470 can include, for example, controlling sub-system(s) in the receiver to change state from the lower power save mode to the higher power receive mode.

All time during power save state 450 till entering receive mode state 470 the CCA line is signaled busy to comply with the protocol and ensure consistency of media access timing At 480, end of frame processing may be performed to maintain acceptable conformance with the controlling protocol. The end of frame processing can include releasing CCA line to be driven by the conventional receive logic and NAV/EIFS processing.

Figure 5:
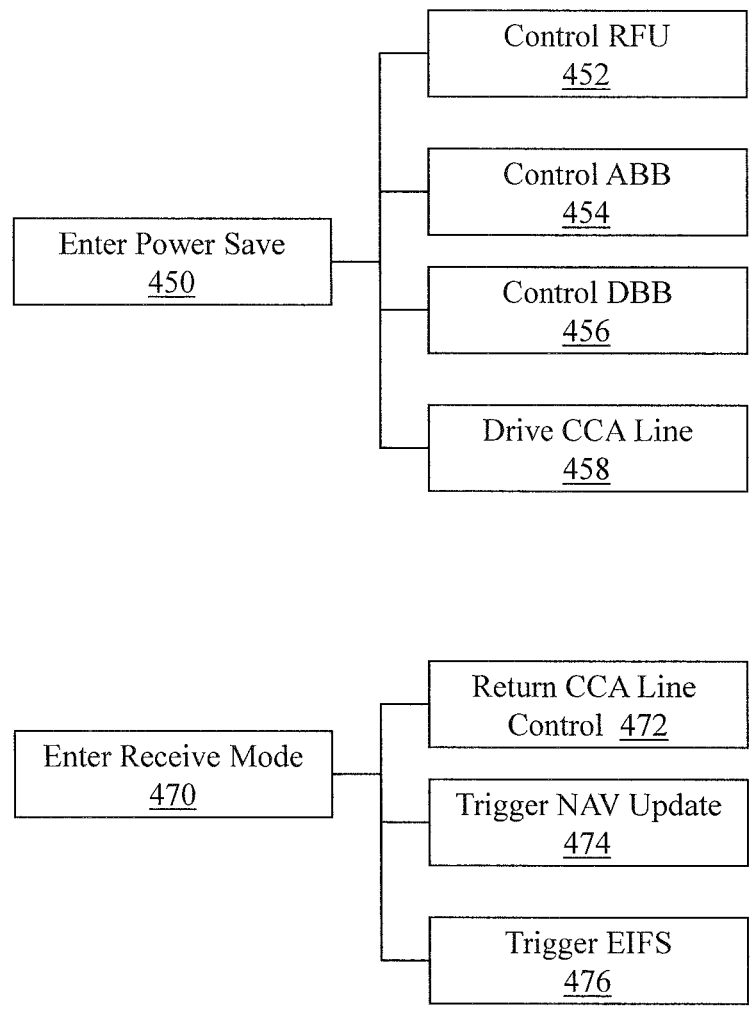
FIG. 5 illustrates more details concerning portions of a method associated with a packet classification based power saving receiver.

FIG. 5 illustrates more details concerning portions of method 400 (FIG. 4). Additional detail concerning entering the power save mode at 450 is provided. Similarly, additional detail concerning entering receive mode at 470 is provided.

Entering the power save mode at 450 can include controlling one or more different sub-systems in the receiver either individually and/or collectively. Therefore, entering the lower power save mode at 450 can include, at 452, controlling a radio frequency unit (RFU) power state. Entering the lower power save mode at 450 can also include, at 454, controlling an analog baseband processing unit (ABB) power state. Entering the lower power save mode at 450 can also include, at 456, controlling a digital baseband processing unit (DBB) power state. Control actions 452, 454, and 456 may be performed serially, in parallel, partially in parallel, and so on.

Different embodiments may include configuring different receive units (e.g., RFU, ABB, DBB) to be able to take on different numbers of states, and for the states to have different power consumptions. In one example, the RFU power states can include, but are not limited to, a first state where the RFU consumes less than $I_{rf\_pd}$ mA of power, a second state where the RFU consumes less than $I_{rf\_slp}$ mA of power, and a third state where the RFU consumes more than $I_{rf\_sb}$ mA of power. In one example, the ABB power states can include, but are not limited to, a first state where the ABB consumes less than $I_{ab\_slp}$ mA of power, a second state where the ABB consumes less than $I_{ab\_sb}$ mA of power, and a third state where the ABB consumes more than $I_{ab\_rx}$ mA of power. In one example, the DBB power states can include, but are not limited to, a first state where the DBB consumes less than $I_{db\_slp}$ mA of power, a second state where the DBB consumes less than $I_{db\_sb}$ mA of power, and a third state where the DBB consumes more than $I_{db\_idle}$ mA of power.

A receiver may be tasked with maintaining a certain signal(s) on a clear channel assessment line during frame receipt and at other times. If the receive unit tasked with maintaining that signal is powered down in power save mode, then another component may be tasked to drive that signal onto the line. Therefore, entering power save mode at 450 can include, at 458, selectively driving a pre-determined signal onto a clear channel assessment line associated with the 802.11 receiver. The signal may be, for example, a BUSY signal.

Entering or returning to the receive mode at 470 can also involve more than one action. If the receiver powered down a component tasked with driving a signal onto the CCA line and therefore employed a different unit (e.g., MAC unit) to provide the CCA signal, then entering the receive mode at 470 can include, at 472, returning CCA line control to the originally tasked component.

Entering the receive mode at 470 can also include making a decision concerning how to treat the end of frame. The choices can include, at 474, selectively triggering network allocation vector (NAV) processing, and, at 476, selectively triggering extended inter frame spacing processing. The decision can be configurable but needs to maintain end of frame processing associated with a carrier sense multiple access collision avoidance (CSMA/CA) protocol with which the 802.11 receiver is complying. Different criteria may be used to decide between NAV/EIFS. In different embodiments, all filtered frames may trigger NAV, all filtered frames may trigger EIFS, some filtered frames may trigger NAV while others trigger EIFS, and so on. Signal strength, SNR, frame length, historical channel reliability, and other factors may be considered when determining how to configure the NAV/EIFS decision associated with entering receive mode at 470.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A receiver apparatus, comprising:
  a receive unit configured with:
    a receive frame state, wherein in the receive frame state, the receive unit is configured to receive an incoming frame and to provide decoded information concerning the incoming frame; and
    an ignore frame state, wherein in the ignore frame state, the receive unit is configured to perform (i) not receiving the incoming frame, or (ii) not decoding the incoming frame;
  a controller configured to selectively control the receive unit to enter the ignore frame state upon determining a desired ratio between a switching time and an amount of time expected to be required to receive a remainder of the incoming frame exceeds a threshold, and to return the receive unit to the receive frame state in time to perform end of frame processing on the incoming frame.

2. A receiver apparatus, comprising:
a receive unit; and
a controller;
wherein the receive unit and the controller are configured to receive wireless messages according to a wireless protocol;
wherein the receive unit is configured with a receive frame state and an ignore frame state, the receive unit further configured to:
when in the receive frame state, receive radio frequency (RF) signals associated with an incoming frame and to provide decoded information concerning the incoming frame; and
when in the ignore frame state, perform one or more of, (i) not receiving RF signals associated with the incoming frame, and (ii) not decoding RF signals associated with the incoming frame;
wherein the controller is configured to selectively control whether the receive unit is in the receive frame state or the ignore frame state, wherein the controller is configured to control the receive unit to enter the ignore frame state upon determining that (i) the incoming frame is to be filtered and (ii) a desired ratio between a switching time and an amount of time expected to be required to receive a remainder of the incoming frame exceeds a threshold, and to return the receive unit to the receive frame state in time to perform end of frame processing on the incoming frame consistent with the wireless protocol.

3. The receiver apparatus of claim 2, wherein the receive unit comprises:
a radio frequency unit (RFU) configured to receive the RF signals associated with the incoming frame, the RFU unit having two or more power states;
an analog baseband unit (ABB) configured to convert analog baseband signals associated with the incoming frame into digital baseband signals associated with the incoming frame, the ABB having two or more power states; and
a digital baseband unit (DBB) configured to decode the digital baseband signals and to provide the decoded information, the DBB having two or more power states.

4. The receiver apparatus of claim 3, wherein the controller is configured to control a receive unit state by controlling one or more of, an RFU power state, an ABB power state, and a DBB power state.

5. The receiver apparatus of claim 3, wherein the two or more RFU power states comprises:
a power down state wherein the RFU consumes Irf_pd mA of power;
a sleep state wherein the RFU consumes less than Irf_slp mA of power;
a standby state wherein the RFU consumes less than Irf_sb mA of power; and
a receive state wherein the RFU consumes more than Irf_rx mA of power;
wherein Irf_rx>Irf_sb>Irf_slp>Irf_pd.

6. The receiver apparatus of claim 3, wherein the two or more ABB power states comprises:
a sleep state wherein the ABB consumes less than Iab_slp mA of power;
a standby state wherein the ABB consumes less than Iab_sb mA of power; and
a receive state wherein the ABB consumes more than Iab_rx mA of power;
wherein Iab_rx>Iab_sb>Iab_slp.

7. The receiver apparatus of claim 2, wherein the decoded information includes (i) an identifier of an intended target for the incoming frame and (ii) an expected duration of the incoming frame.

8. The receiver apparatus of claim 4, wherein the controller comprises a media access control (MAC) unit configured to decode frame information from the decoded information, wherein the incoming frame comprises:
a physical layer (PHY) header;
a signal field;
a media access control (MAC) header;
a payload; and
a frame check sequence (FCS),
wherein the signal field includes information from which the amount of time expected to be required to receive a remainder of the incoming frame is computed.

9. The receiver apparatus of claim 2, wherein the controller is configured to determine that the incoming frame is to be filtered based on an intended target, sender identity (ID) and frame type/subtype from a MAC Header of the incoming frame.

10. The receiver apparatus of claim 9, wherein the controller is configured to determine that the incoming frame is to be filtered based on one or more of, a signal strength associated with the RF signals associated with the incoming frame, and a signal to noise ratio (SNR) associated with the RF signals associated with the incoming frame.

11. The receiver apparatus of claim 2, wherein the switching time comprises an amount of time required to switch the receive unit from the receive frame state to the ignore frame state and back to the receive frame state.

12. The receiver apparatus of claim 2, wherein the controller is configured to drive a pre-determined signal onto a clear channel assessment line controlled by the receiver apparatus while the receive unit is in the ignore frame state in order to preserve the wireless protocol's behavior.

13. The receiver apparatus of claim 2, wherein the end of frame processing consistent with the wireless protocol comprises one or more of, triggering a network allocation vector (NAV) update, and triggering extended inter-frame spacing (EIFS) processing.

14. The receiver apparatus of claim 13, wherein the end of frame processing consistent with the wireless protocol comprises one or more of:
treating a filtered incoming frame as a frame that has passed a frame check sequence (FCS) test by triggering NAV update processing for the filtered incoming frame;
treating a filtered incoming frame as a frame that has failed an FCS test by triggering EIFS processing for the filtered incoming frame; and
selectively triggering NAV update processing when a filtered incoming frame is less than a threshold duration and selectively triggering EIFS processing for a filtered incoming frame when a filtered incoming frame is longer than the threshold duration.

15. A transceiver device, comprising:
a receiver configured to selectively change from a higher power receive state to a lower power state, wherein the lower power state a remainder of incoming radio frequency signals associated with an incoming frame is not received or decoded upon deciding to ignore the incoming frame,
wherein deciding to ignore the incoming frame is a function of analyzing information gathered by partially receiving and partially decoding the incoming frame, the information comprising an intended target for the incoming frame, an expected amount of time required to receive the incoming frame, and an expected power savings, wherein the expected power savings is computed based, at least in part, on a frame duration and switching times for the receiver.

16. A method, comprising:

receiving, by a wireless receiver, a portion of an incoming frame;

deciding whether to process the incoming frame or to ignore the incoming frame, wherein deciding to ignore the incoming frame is a function of analyzing information gathered by partially receiving and partially decoding the incoming frame, wherein the information comprises at least an intended target for the incoming frame, an expected amount of time required to receive the incoming frame, and an expected power savings, wherein the expected power savings is computed as a function of a frame duration and switching times for one or more sub-systems; and upon deciding to ignore the incoming frame, controlling the one or more sub-systems in the wireless receiver to change state from a higher power receive state to a lower power state so that a remainder of incoming radio frequency (RF) signals associated with the incoming frame is not decoded by the wireless receiver.

17. The method of claim 16, further comprising selectively changing the one or more sub-systems in the wireless receiver from the lower power state to the higher power receive state in time to receive a subsequent incoming frame after the remainder of incoming RF signals from the ignored incoming frame end.

18. The method of claim 16, further comprising:

upon determining to change the one or more sub-systems in the wireless receiver from the higher power receive state to the lower power state, selectively driving a predetermined signal onto a clear channel assessment line associated with the wireless receiver, and maintaining end of frame processing associated with a wireless protocol with which the wireless receiver is complying by selectively triggering either (i) network allocation vector (NAV) processing, or (ii) extended inter frame spacing processing.

* * * * *